United States Patent [19]

Thompson

[11] Patent Number: 4,799,875
[45] Date of Patent: Jan. 24, 1989

[54] ARTICULATED BELT LIKE TOROID FORMING MACHINE

[76] Inventor: Daniel T. Thompson, 1141 Napoli Dr., Pacific Palisades, Calif. 92079

[21] Appl. No.: 138,836

[22] Filed: Dec. 23, 1987

[51] Int. Cl.$^4$ ............................................. A21C 9/08
[52] U.S. Cl. ..................................... 425/329; 99/485; 425/364 B; 426/512
[58] Field of Search ............... 425/329, 241, 287, 288, 425/253, 452, 453, 259, 364 R, 364 B, DIG. 117, DIG. 118, 233, 237; 99/485; 426/512, 514

[56] References Cited

U.S. PATENT DOCUMENTS

| | | | |
|---|---|---|---|
| 1,552,430 | 9/1925 | Gendler | 425/364 R |
| 1,755,921 | 4/1930 | Gendler | 425/297 |
| 2,187,253 | 1/1940 | Wallace | 425/329 |
| 2,187,254 | 1/1940 | Wallace | 425/329 |
| 2,666,398 | 1/1954 | Gendler | 425/101 |
| 3,031,979 | 5/1962 | Thompson | 425/206 |
| 3,080,831 | 3/1963 | Paitchell et al. | 425/329 |
| 3,379,142 | 4/1968 | Reiter | 425/237 |
| 3,433,182 | 3/1969 | Thompson | 425/305.1 |
| 3,792,940 | 2/1974 | Thompson | 425/296 |
| 3,986,446 | 10/1976 | Thompson | 99/485 |
| 4,147,809 | 4/1979 | Thompson | 425/288 X |
| 4,218,207 | 8/1980 | Thompson | 425/241 |
| 4,368,019 | 1/1983 | Thompson | 425/141 |
| 4,478,565 | 10/1984 | Thompson | 425/141 |

FOREIGN PATENT DOCUMENTS

| | | | |
|---|---|---|---|
| 2202633 | 8/1973 | Fed. Rep. of Germany | 425/253 |
| 2537955 | 3/1976 | Fed. Rep. of Germany | 425/253 |

OTHER PUBLICATIONS

SKETCH of prior art toroid forming machine, Thompson Bagel Machine Mfg. Corp., Los Angeles, Calif., Prior to Dec. 23, 1987.

Primary Examiner—Richard L. Chiesa
Attorney, Agent, or Firm—Poms, Smith, Lande & Rose

[57] ABSTRACT

A toroid forming machine has a plurality of individual laterally flexible dough forming members mounted upon a conveyor chain to revolve about spaced sprockets, the forming members being drawn through a stationary sleeve formed by opposing one-half sleeve members from a substantially flat initial configuration to a substantially closed cylindrical configuration at an exit end of the sleeve. A stationary mandrel is provided centrally of the sleeve to allow molding of dough strips between the forming members and mandrel into toroid configuration suitable for making bagels. End portions of the mandrel and sleeve are removable and have an expanding configuration to allow for varying the size of toroids exiting the sleeve. The forming members and the associated conveyor chain are easily removed for replacement by different size members as are the mandrel and sleeve members. A drive sprocket of the conveyor means is mounted on a swing carriage to release the conveyor for replacement or cleaning, a mandrel is removably mounted to the machine frame and the sleeve members are mounted on movable support members for ease of cleaning or replacement.

19 Claims, 6 Drawing Sheets

ARTICULATED BELT LIKE TOROID FORMING MACHINE

BACKGROUND OF THE INVENTION

This invention relates in general to machines for forming toroids, or doughnuts, from fairly heavy, tacky dough employed in the bagel making industry. More specifically, the present invention relates to such a machine which employs a plurality individual forming members mounted on a revolving conveyor which cooperate with a stationary mandrel to form dough bodies in the form of toroids suitable for making bagels, doughnuts, or the like.

Various types of machines for automatically forming dough into toroids for subsequent proofing and baking have been developed heretofore and are in use commercially. In one type of such machines, a continuous belt is drawn through a stationary tube having a dough forming mandrel positioned centrally thereof to form dough strips into toroid configuration. An advantage of the belt type bagel making machine is that the belt, associated mandrel and sleeve through which the belt passes can be switched on any particular machine to provide for the making of different size bagels. Such machines are also generally less expensive to construct than the rigid cup type machines discussed hereinafter. A disadvantage of the belt machines is that belts tend to wear out in any where from three to six months time. The belt is mounted on associated pulleys which drive the belt from a generally flat configuration into the sleeve whereby it is formed into a cylindrical configuration about the stationary mandrel. Also, as the belt exits the surrounding sleeve it attempts to quickly resume its flat configuration, since its being pulled by an associated pulley. This closing and opening of the belt as it enters and leaves the surrounding forming sleeve tends to wear the belt accordingly. In addition, the length of this type of machine is necessarily fairly long in order to allow for the closing and opening of the belt as it approaches and leaves the forming sleeve within which the dough bodies are formed. Exemplary of such prior art machines are the U.S. Pat. Nos. 1,552,430, 1,755,921 and 2,666,398.

Other types of prior bagel making machines have used metal forming cups which are manipulated by the apparatus as opposed to the use of a belt for forming bagels as mentioned above. One approach is shown in the Ritter U.S. Pat. No. 3,379,142 where a plurality of half cups are provided on two opposed conveyors arranged so that the cups come together around a stationary mandrel to form dough therebetween. Another approach has been to use a single conveyor having metal cups of cylindrical configuration which are themselves articulated by virtue of being in three relatively hinged rigid pieces which are guided during the forming operation by associated tracks as the cups pass a stationary mandrel. Exemplary thereof are my prior Pat. Nos. 3,031,979; 3,433,182; 3,792,940; 3,986,446; 4,147,809; 4,218,207; 4,368,019; and 4,478,565. Machines for making bagels or other dough products in toroid configuration employing metal cups as in these patented machines have the advantage of long life. However the metal forming cups from a practical standpoint must be coated with a plastic material so as to prevent the dough from adhering thereto. Sometimes the plastic coating on the cups tends to wear and the cups must be removed for sandblasting and then recoating before being replaced. Also, while these metal cup forming member machines can be made in relatively short length for convenience of their location in a commercial bakery environment, they are limited to making a single size of dough product determined by the size of the forming cups.

I am also aware of a prior art toroid forming means employed prior to my present application in a commercial establishment known as the Bagel Factory in Los Angeles, California.

PRIOR ART

Figures 14, 15, 16, 17, 18:
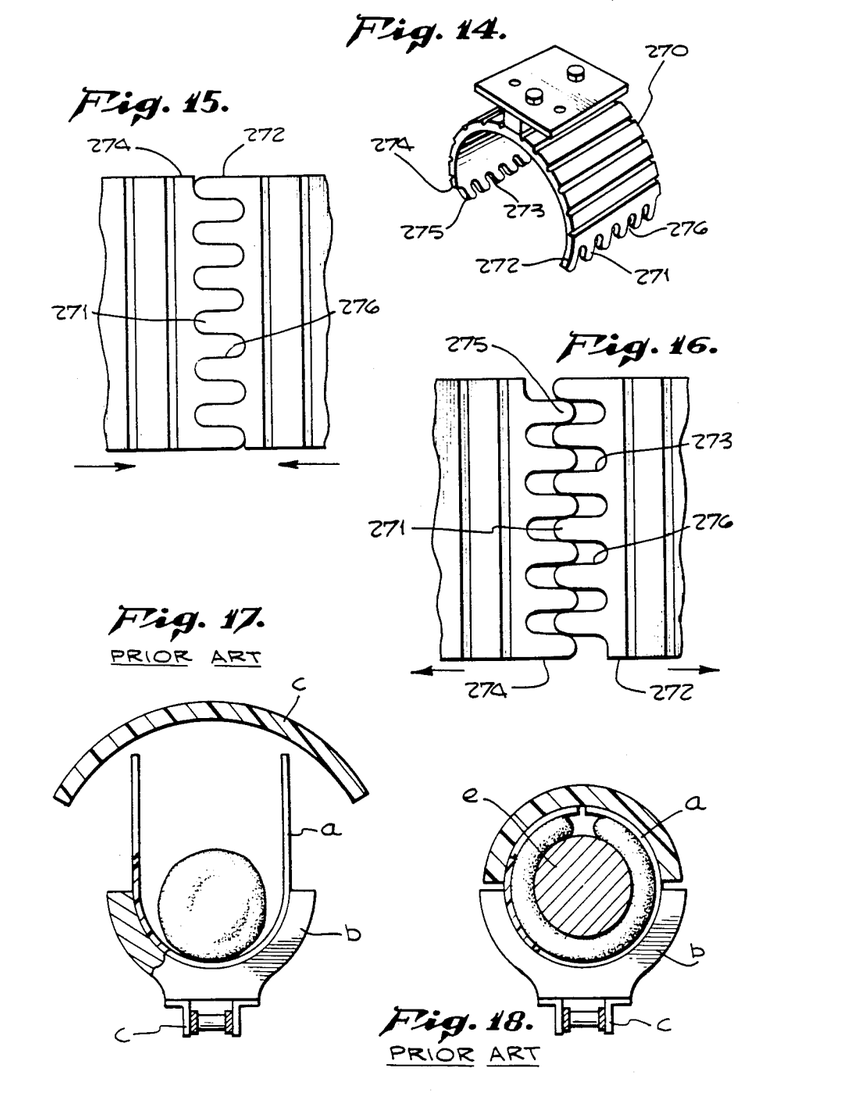
FIG. 14 is a perspective view of an alternative exemplary embodiment of dough forming member in accordance with the present invention having interlocking fingers and finger spaces on outer ends thereof.
FIG. 15 is a detailed view of the outer end portions of the exemplary embodiment of dough forming member of FIG. 14 showing the fingers and finger spaces of the ends in interlocked relation.
FIG. 16 is a view as in FIG. 15 showing the dough forming member end fingers only partially entering the opposing mating finger spaces in an interengaging relation.
FIG. 17 is a vertical front end view, partially in section, of a prior art toroid forming means.
FIG. 18 is a vertical view of the forming means of FIG. 17 showing the toroid being formed.

Referring to FIGS. 17 and 18, this prior toroid forming means comprised a relatively thin, flexible plastic sheets of which was of a polypropylene or neoprene material and provided in a substantially rectangular configuration which was laminated to semicylindrical rigid cups, as cup b in FIG. 17. The cups where mounted directly to a conveyor chain c.

A half-cylinder member d was provided above the cup chain c to engage and fold the free ends of the plastic sheets about a centrally disposed stationary mandrel e so as to form dough toroid. In this prior machine, the rigid semi-cylindrical cups prevented the sheets a from assuming a flat configuration for a preroll of dough below the mandrel and, together with the chain, where too heavy an assembly for ease of replacement of the cup-chain assembly for making different size toroids. This machine is believed to have been replaced by a belt machine and is no longer in use.

SUMMARY OF THE INVENTION

In view of the foregoing it is the primary object of the present invention to provide a toroid forming machine having the advantages of both of the prior belt forming and metal cup forming type machines. More specifically, objects of the present invention include the provision of such a machine which is easily manufactured and operated, which has a relatively short length for ease of utilization in commercial environments, which is easily dismantled for cleaning or repair, which is provided so that it may be easily modified to make dough products of varying size and has a long working life.

Generally stated, the present invention in a toroid forming machine contemplates the provision of an articulated belt like apparatus wherein a plurality of individual toroid forming members are provided upon an associated conveyor means for operation in association with an appropriate stationary mandrel, each of the forming members being provided in a uniformly flexible manner laterally across the width thereof so as to be easily pliable to an infinite variety of configurations together with shaping means for shaping the individually flexible forming members into a desired configuration about the stationary mandrel as they pass thereby on the associated conveyor means, thereby forming toroids of dough which may be rolled between the mandrel and forming members.

More specifically, the present invention in an articulated, belt like toroid forming machine includes the provision of a pair of opposed sleeve half members positioned in opposing relation which have a substantially cylindrical configuration at an exit end thereof but provide an open entrance end wherein each sleeve half member has an entrance portion which is substantially a quarter segment relative the cylindrical exit end and each is substantially flattened to receive a dough forming member thereon in substantially flat configuration. The plurality of individual dough forming members are preferably provided as one piece plastic members, preferably made of a polypropylene plastic, which are comprised of a plurality of individual non-flexible sections joined by integral, relatively thin, web portions to provide a uniform lateral flexibility across the forming member whereby it may assume a substantially flat configuration at the entrance end of the aforementioned sleeve members and be pressed through a infinite number of closing configurations to a cylindrical configuration about the stationary mandrel prior to exiting the sleeve members to thereby form a strip of dough into a toroid.

More specifically, the mandrel and sleeve members may have replaceable exit end portions which are of variable expanding diameter so as to cause a toroid being formed between the forming members and mandrel to be expanded in size as it passes through the mandrel end and sleeve end portions. By varying the length of such end portions, the size for any given weight of dough product being formed can be selectively varied.

It is also contemplated within the present invention that the plurality of individual forming members be mounted on a conveyor means including a supporting chain which is carried by a pair of spaced sprockets, wherein one of the sprockets is suspended on a swing mounting carriage which is easily released from an operative position to allow release of the tension on the conveyor chain and thus the easy replacement of the conveyor chain and associated forming members thereby allowing for the adjustment of the apparatus to make different size dough products by virtue of differing the size of the forming members. It is also contemplated within the present invention that the sleeve members aforementioned through which the flexible forming members pass be mounted on moveable and/or releasable mounting means to facilitate their selective separation for cleaning, or removal for replacement for differing the size thereof to cooperate with a different size set of forming member when the latter are varied as noted before.

A more complete understanding of the present invention will be afforded to those skilled in the art from a consideration of the following detailed description of a preferred exemplary embodiment and alternative embodiments thereof. It will also become apparent to those skilled in the art that there are additional advantages and objects of the present invention which are provided by the present improved articulated belt like toroid forming machine. In giving the following detailed descriptions, reference will be made to the appended sheets of drawings which will be first described briefly.

DETAILED DESCRIPTION OF PREFERRED EXEMPLARY EMBODIMENT

Figures 1, 10:
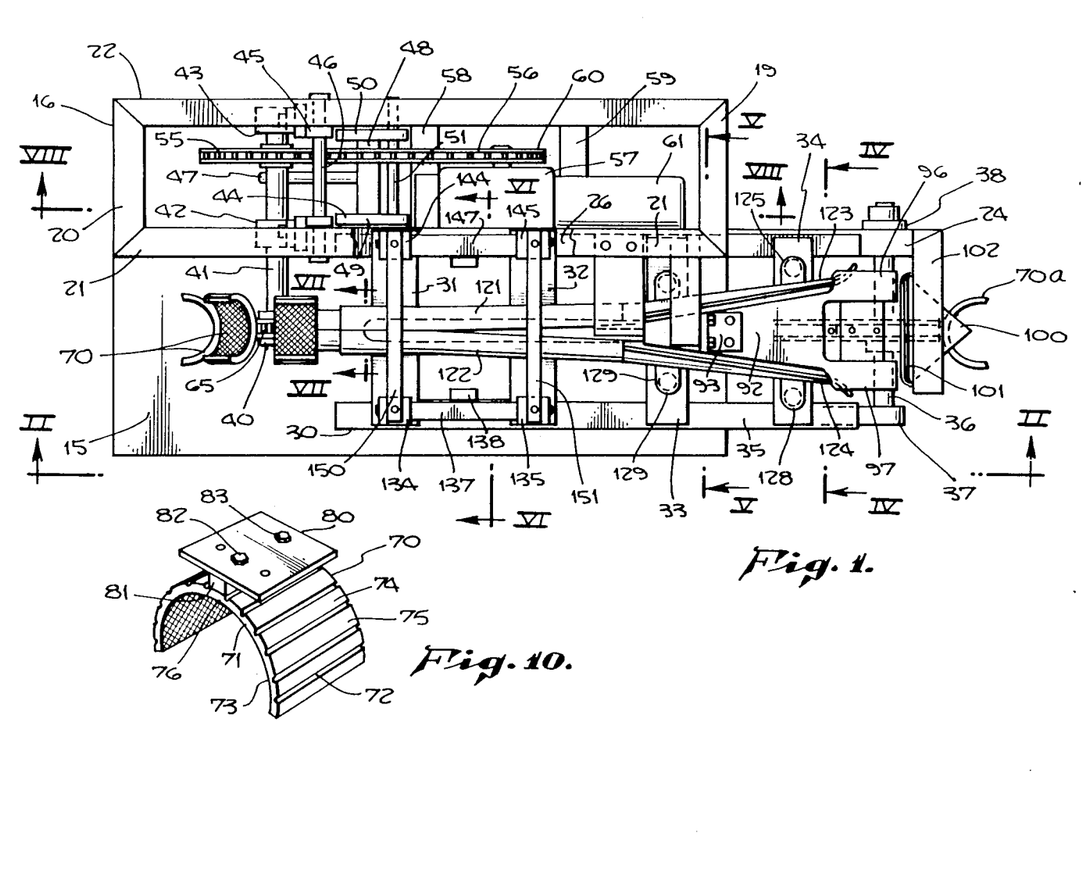
FIG. 1 is a plan view of a preferred exemplary embodiment of the articulated belt like toroid forming machine in accordance with the present invention.
FIG. 10 is a perspective view of a preferred exemplary embodiment of dough forming member in accordance with the present invention.
Figures 2, 3:
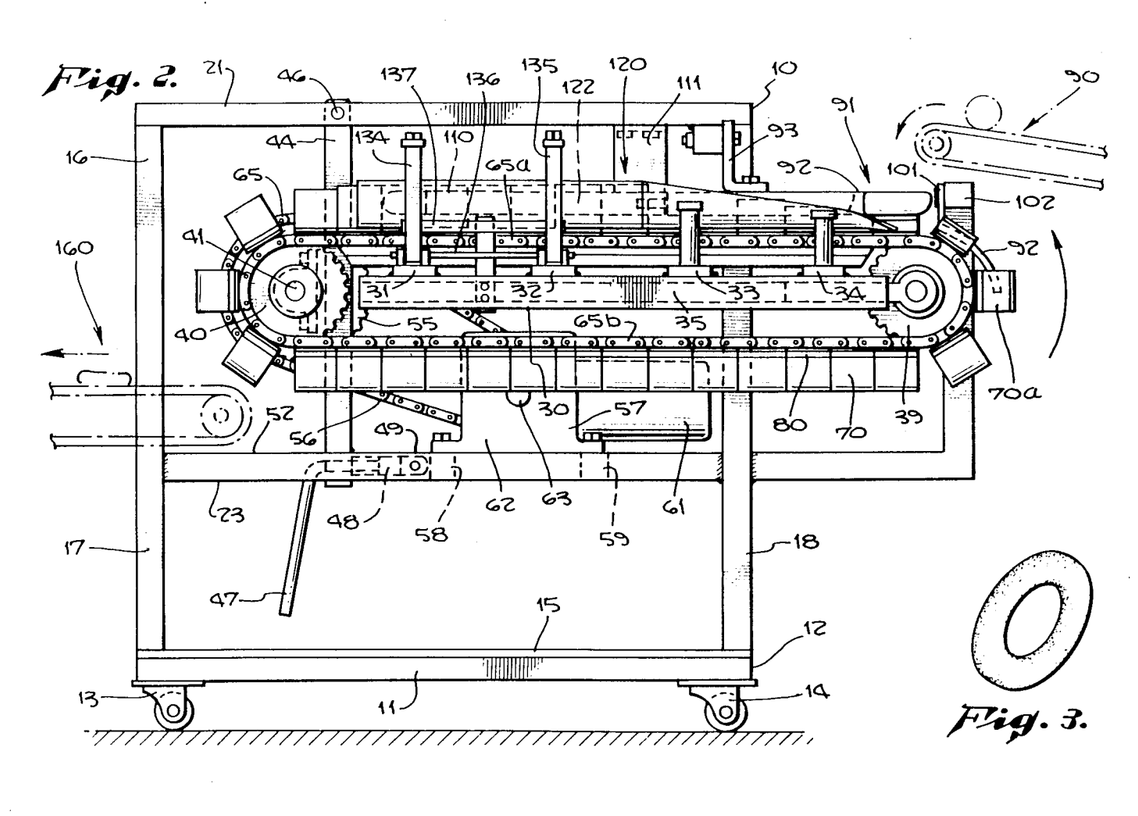
FIG. 2 is a side view of the machine of FIG. 1 taken therein along the plane II—II.
FIG. 3 is perspective view of an exemplary embodiment of toroid formed by the machine of FIGS. 1 and 2.

A detailed description of the preferred exemplary embodiment of articulated belt like toroid forming machine, in accordance with the present invention will now be provided in association with the illustrations of FIGS. 1 through 10. Referring initially to FIGS. 1 and 2, an otherwise conventional machine frame 10 is fabricated in known manner in a somewhat rectangular box like configuration. The frame has front, back and side lower rails of box configuration with the right side rail 11 being seen in FIG. 2. This lower base portion 12 of the frame is mounted at its four corners on casters, such as casters 13 and 14 and has a pan 15 provided there over. A vertical frame portion 16 is provided a rearward portion of the base portion 12 and includes a pair of vertical rear frame members, the right rear vertical frame member 17 being seen in FIG. 2, and a pair of vertical front frame members, the right front frame member 18 being seen in FIG. 2. As seen in FIG. 1, the upper end of this upper frame portion 16 has horizontal front and rear members 19 and 20, respectively and right and left side members 21 and 22 respectively, these members forming a box like top frame portion. The frame members are fabricated in known manner by welding the various components together. The vertical frame portion 16 also has a lower box like frame portion 23 which has front, rear and side frame members as with the top portion. The vertical frame portion 16 further is provided with a forwardly cantilever rectangular box frame portion 24 of U-shaped frame members mounted to the main frame member, U-shape member 25 being shown mounted to the right side front vertical frame member 18 in FIG. 2.

The machine frame 10 is further provided with a cantilevered side subframe portion employed in the present machine for mounting the exemplary conveyor means, mandrel means and member shaping means in operative relation as subsequently described. This sideward cantilevered subframe 30, as seen in FIGS. 1 and 2, has a plurality of horizontal base plates 31, 32, 33 and 34 which are welded to a horizontal frame member 26 at one end and to a horizontal bar 35 at the other. The forward sprocket shaft 36 is mounted by a right side journal 37, which in turned is mounted to the side bar 35 in known manner. Shaft 36 is mounted at its opposite end by journal 38 which is mounted in known manner to the rear U-shaped frame member of the forwardly cantilevered subframe portion 24. Forward sprocket 39 is shown in FIG. 2 on the forward shaft 36.

Figures 7, 8:
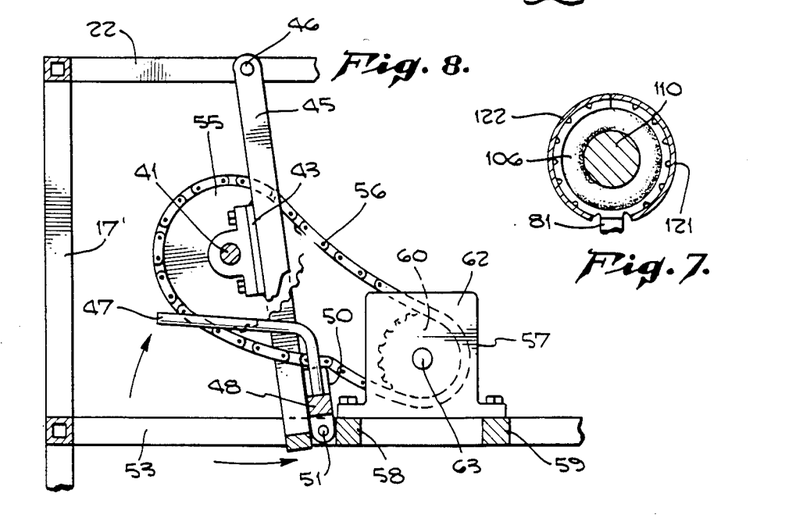
FIG. 7 is a detailed view of the machine of FIG. 1 taken therein along the plane VII—VII showing the dough strip formed into a completed toroid about the exemplary mandrel and within the adjacent exemplary embodiment of dough forming member which has assumed a completed cylindrical configuration.
FIG. 8 is a partial section view of the machine of FIG. 1 taken thereon along the plane VIII—VIII showing the drive sprocket and drive chain moved to a deactivated position wherein the main conveyor chain can be easily removed for cleaning or replacement.

Complementary to the front sprocket 39, is a rear sprocket 40 as seen in FIG. 1, which is mounted on a rear sprocket shaft 41 which is journaled, as best seen in FIG. 1, by the spaced journals 42 and 43 which are bolted in known manner to a pivotally suspended swing frame comprising vertical side bars 34 and 45, respectively which are pivotally suspended on bar 46 which in turn is journaled in the top frame unit side bars 21 and 22, respectively. The exemplary swing frame, including the side bars 44 and 45 are held in a fixed vertical orientation relative to frame 10 by a pair of releasable cam lock means as seen in FIGS. 2 and 8. A handle 47 is provided on cross brace 48 which extends between a front block 49 and a rear block 50 which are each pivotally mounted by axial 51 running between the side frame members 52 and 53 respectively. When the blocks 49 and 50 are in a lowered, horizontal position as seen in FIGS. 1 and 2, they block movement, or cam lock, the lower ends of the swing frame side bars 44 and 45. The positioning of rear sprocket 40 relative to the front sprocket 39 is thus in a fixed relationship. As is contemplated within the scope of the present invention, the positioning of rear sprocket 40 may be easily adjusted by manipulation of handle bar 47 to allow assembly, disassembly and replacement of the conveyor means of the present invention as will be subsequently described.

Drive means are provided in accordance with the present invention for driving the rear sprocket 40 via its sprocket shaft 41. As best seen in FIGS. 1 and 8, a drive sprocket 55 is rotatably mounted on rear sprocket shaft 41 and is driven by drive chain 56 which in turn is driven by a conventional motor means 57, bolted on subframe members 58 and 59 spanning the distance between frame members 52 and 53, where the conventional motor sprocket 60 engaging and driving chain 56. Motor means 57 includes a conventional electrical motor 61 which operates through a gear reduction, transmission means 62 which in turn has the output shaft 63 upon which motor sprocket 60 is mounted.

Conveyor means are provided, in accordance with the present invention, for mounting the toroid forming members, as hereinafter described, in a substantially continuous, belt like array in a closed revolving loop with the members facing outwardly of such loop. In the preferred exemplary embodiment, such conveyor means include the forward sprocket 39, rear sprocket 41, their respective mounting means including the shafts, journals and supporting frame members aforedescribed, and the conveyor chain 65. The conveyor chain 65 as seen in FIGS. 1 and 2 is mounted on the front and rear sprockets 30 and 40, respectively, to revolve therewith in a closed revolving loop configuration in this exemplary embodiment. It is contemplated that other conveyor configurations may be adapted to utilize the toroid forming members and associated mandrel and member shaping means, in accordance with the present invention as hereinafter described.

As is particularly contemplated within the scope of the present invention, a plurality of individual toroid forming members, each of which have a uniformly flexible body characteristic laterally across the width thereof are provided upon the exemplary conveyor means in a substantially continuous, articulated belt like array. Referring first to FIG. 10, a preferred exemplary embodiment of toroid forming member 70 is illustrated which has a body 71 of generally rectangular configuration which is preferably molded in a one piece unit of low friction surface plastic material, specifically and preferably a polypropylene material. Body 71 is either molded, or subsequently machined, to have a plurality of channels, as channel 72 in FIG. 10, extending laterally across the width of body 71. Each of the channels is provided of sufficient depth so as to provide a hinge like web, as web 73, between the otherwise non-flexible body sections, as sections 74 and 75 which are flexible relative to each other via the integral connecting web 73 therebetween. As seen in FIG. 10, the preferred forming member has fifteen individual body sections as sections 74 and 75 referred before, separated by relatively thin walled webs, as web 73 previously mentioned, which provide for a hinging interconnection between the sections and a uniform flexibility by the uniform spacing of such webs, across the lateral extent of body 70.

Figure 5:
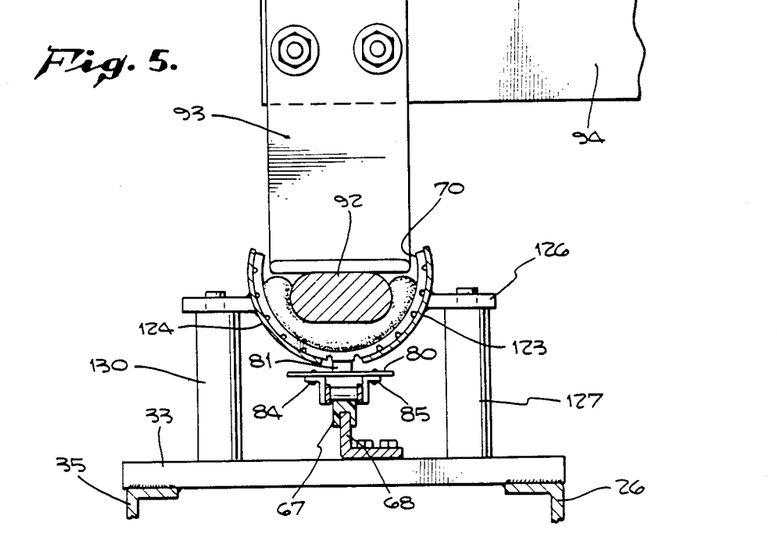
FIG. 5 is a detailed view, partially in section, of the machine of FIG. 1 taken therein along the plane V—V showing the dough strip formed into a semi-toroid beneath the exemplary mandrel and above the adjacent exemplary embodiment of dough forming member which has assumed a semi-cylindrical configuration.

Each of a plurality of toroid forming members, as member 70 in FIG. 10, are mounted to the conveyor means of conveyor chain 65 via mounting plates 80, as seen in FIG. 10, which are secured to mid-sections, as section 76 in FIG. 10, of the associated toroid forming member. The exemplary mounting plate 80 has a mounting foot 81 secured thereto by conventional bolts 82 and 83, the foot 81 being bored and threaded on the under surface thereof to receive mating mounting screws threaded through appropriate spaced bores through the body midsection 76. As seen in FIG. 5, chain 65 is provided with side brackets, as brackets 84 and 85 in FIG. 5, for mounting each of the plurality of mounting plates 80, and the individual plates associated toroid forming member 70 in an outwardly facing position on the conveyor means relative to the loop configuration through which the chain revolves the associated members. The chain is supported in known member by a support track 67 provided on a mounting flange 68 bolted to the base plate 33 in FIG. 5, and to the corresponding base plates 31, 32 and 34 in the other areas of the upper lay 65a of the chain. The upper lay 65a of the chain 65 runs from the forward end where it is suspended on the front sprocket 39 as seen in FIG. 4, over the base plate supported rail 67 as seen in FIGS. 5 and 6 to the rear sprocket 40 as seen in FIG. 2. The lower lay 65b of chain 65, as seen in FIG. 2, passes from the rear sprocket 40 to the front sprocket 39 with the plurality of toroid forming members simply suspended therefrom by the mounting plates 80. Each of the toroid forming members 70 is mounted by its associated mounting plate 80 to the chain 65, as aforedescribed, in abutting relation with the next adjacent forming member, as seen in FIG. 2, so as to provide an articulated belt like continuous array of toroid forming members which are separated from one another as they pass about the sprockets 39 and 40, as seen in FIG. 2, but are close abutting relationship to one another as they travel across the upper chain lay 65a where they cooperate, in accordance with the present invention, with mandrel means and member shaping means to form toroids in an improved method and mode of operation as will now be described.

Figure 4:
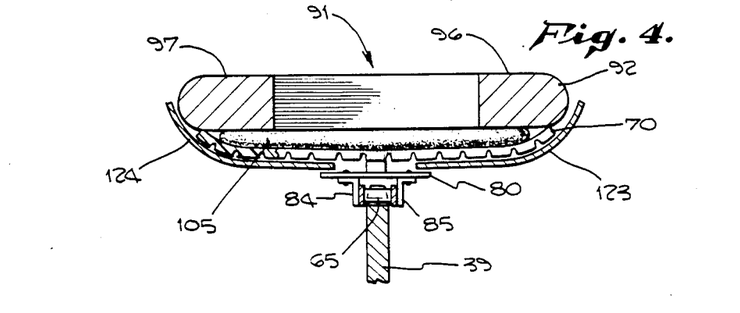
FIG. 4 is a detailed view, partially in section, of the machine of FIG. 1 taken therein along the plane IV—IV showing a strip of dough being formed between the exemplary dough molder and adjacent exemplary embodiment of dough forming member shown in a substantially flat configuration beneath the molder.

As is particularly contemplated, within the method and novel mode of operation for the dough forming members, in accordance with the present invention, the uniform flexibility in the lateral direction of the members 70, as aforedescribed, allows them to assume a substantially flat configuration as seen in FIG. 4 at a dough entrance portion of the toroid forming machine. The toroid entrance portion of the machine, as seen in FIGS. 1 and 2, is at the forward end of the machine where a dough ball supplying conveyor is illustrated schematically generally at 90. Dough balls or pieces may be provided from such a conveyor to the dough entrance, indicated generally at 91 where the dough may fall onto the opened dough forming members to be passed below a dough molder. As seen in FIGS. 1 and 2, an exemplary dough forming member 70a is shown in an open, semi-cylindrical configuration moving up under a member opening, triangular plate 100 which spreads the member body to a substantially flat configuration as its enters under the dough molder 92. Exemplary dough molder 92, as seen in FIGS. 1, 2, 4 and 9, is positioned at an entrance end of the machine above the conveyor means front sprocket 39 via the mounting angle flange 93 which is bolted to the support bar 94 which in turn is welded to the frame top member 21. The rear end of dough molder 92 has a pin 95 which positions the molder snugly to a forward end of the exemplary mandrel means subsequently described. The dough molder has forwardly extending side guides 96 and 97 which overlie the spread lateral extremities of the dough forming members as they leave the spread plate 100. Plate 100 is mounted by a vertical flange portion 101 to the frame cross bar 102 as seen in FIGS. 1 and 2. Dough pieces or balls received in the dough entrance, indicated generally at 91, are rolled below the generally flat under surface of dough molder 92 on top of the substantially flattened dough forming members 70 into a generally strip configuration as represented by dough piece 105 as seen in FIG. 4.

As the dough strips, as dough strip 105 in FIG. 4, move from the dough entrance end of the machine to the dough exiting rear end of the machine, they are rolled between the toroid forming member 70 and mandrel means so as to form a toroidal configuration for the dough.

Figure 6:
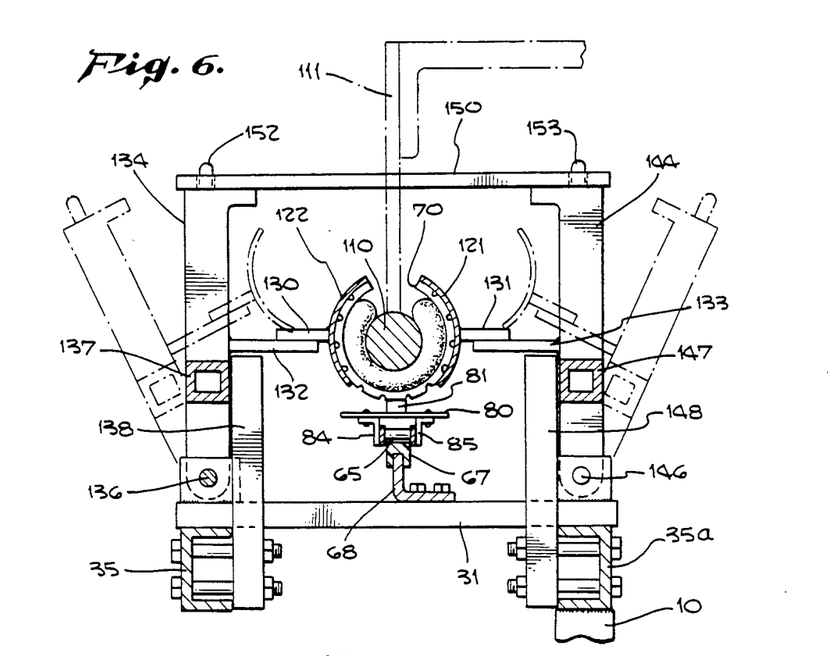
FIG. 6 is a detailed view, partially in section, of the machine of FIG. 1 taken therein along the plane VI—VI showing the dough strip assuming a near toroid form about the exemplary mandrel and within the adjacent exemplary embodiment of dough forming member which has assumed a near cylindrical configuration.
Figure 9:
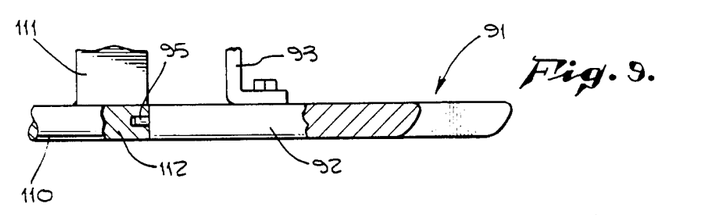
FIG. 9 is a side view, partially in section of the exemplary dough molder.

Mandrel means are positioned relative to the conveyor means, including conveyor chain 65's upper lay 65a, so as to allow the passage of the toroid forming members thereabout with dough strips positioned therebetween to form toroids in accordance with the present invention. In the exemplary embodiment, such mandrel means includes the provision of, in this exemplary embodiment, an otherwise conventional dough forming mandrel 110 which is suspended generally horizontally above and in line with the upper lay 65a of the conveyor chain via the mandrel mounting flange 110 bolted in known manner to the machine frame upper frame member 21 as seen in FIGS. 1, 2 and 6. As seen in FIG. 9, a forward end 112 of mandrel 110 is configured to mate with the rear end of the dough molder 92 and to receive the positioning pin 95 of the dough molder, thus positioning the dough molder and mandrel front end 112 in secure mating relation. In accordance with the present invention, the mandrel 110 is mounted for ease of removal for cleaning or replacement and thus has the presently described assembly and positioning feature relative to the rear end of the dough molder 92. Mandrel flange 111 is bolted removably to the machine frame. As seen in FIG. 6, the mandrel assumes a generally cylindrical configuration over the majority of its length whereby the central aperture and internal diameter of the toroidal dough body being formed is provided.

In order to form the outer diameter of the dough body in a toroid form, as seen in FIG. 3, the laterally flexible toroid forming members 70, of the present invention are shaped during their movement along the aforedescribed mandrel 110 via the supportive conveyor means including chain 65 by member shaping means which will now be described.

The configuration of the individual toroid forming members 70 as they are moved along the upper lay 65 of the conveyor means is controlled, in the exemplary embodiment, by member shaping means, indicated generally at 120 which, in the present exemplary embodiment, includes the provision of a split tubular assembly of left and right sleeve members 121 and 122, respectively and when viewed from above, facing toward the dough entrance end of the machine in FIG. 1. Each of the sleeve members 121 and 122 have forward, or entrance end portions 123 and 124, respectively, which are substantially flat over their inwardly extending portions, as seen in FIG. 4 with up turned outer edge portions. The sleeve members 121 and 122, as seen in FIGS. 4, 5 and 6 are spaced from each other at their lower inwardly directed edges so as to allow the passage therebetween of the connection between the individual toroid forming members 70 and the conveyor chain 65 provided by the mounting foot 81 of each of the member mounting plates 80. The configuration of each of the sleeve members 121 and 122 starts out at the forward end of the machine in the substantially flat configuration as seen in FIG. 4 and progresses gradually to the semicylindrical configuration as seen in FIG. 5, to the substantially cylindrical configuration as seen in FIG. 6 and to the completed cylindrical configuration at the exit end thereof as seen in FIG. 7. The individual low friction material, plastic material toroid forming members 70, in accordance with the present invention, slide smoothly and in a continuous array between the sleeve members 121 and 122 from the substantially flat configuration of FIG. 4, to the semi-cylindrical configuration of FIG. 5, to the substantially cylindrical configuration of FIG. 6 and to the completed cylindrical configuration of FIG. 7 as they move therethrough to form dough strips, as strip 105 in FIG. 4, into toroids, as toroid 106 in FIG. 7 in accordance with the present invention. As seen in FIG. 6, the apparatus of the present embodiment allows for the rolling of the dough strip 105 past the mounting flange 111 for the dough mandrel 110 before the free ends of the dough strip are rolled into mating engagement with one another so as to provide a seamless toroid, as dough body 106 in FIG. 7, if such a seamless toroid is desired.

It is very desirable that the sleeve members 121 and 122 are mounted on the machine in such a member that they are easily removed for cleaning procedures. In accordance with the present invention, the opposed sleeve members 121 and 122, as well as their forward portions 123 and 124, which are separately provided, are all easily assembled and disassembled from the machine frame 10. Referring initially to FIGS. 1, 2, and particularly FIG. 5, the forward sleeve portion 123 has mounting flanges 125 and 126 which are mounted upon vertical posts, as post 127 in FIG. 5 via releasable bolts to the underlying base plates 34 and 33, respectively. Similarly, the opposing forward sleeve portion 124 has mounting flanges 128 and 129 which are releasably mounted to vertical posts, as post 130 in FIG. 5, which are bolted in releasable assembled relation to the underlying base plates 34 and 33.

Referring now to FIG. 6, the remaining portions of the sleeve members 121 and 122 are mounted by sleeve member flanges, as flanges 130 and 131 in FIG. 6 to support flanges, such as flanges 132 and 133 in FIG. 6, as by appropriate interconnecting bolts or the like, which in turn are fixed to pivotally mounted flange mounting posts as seen in FIGS. 1, 2 and 6. Mounting posts 134 and 135, as seen in FIG. 2, are pivotally mounted by an axial 136 rotatably mounted by appropriate journals on the support plates 31 and 32, respectively, and have a cross brace 137 extending therebetween. As seen in FIG. 6, their upright position is limited in the direction toward mandrel 110 by the stop bar 138 which is bolted the bar 35.

Posts 134 and 135, when in a released condition, may be pivoted as shown in dotted line in FIG. 6 to withdraw the sleeve member 122 from the area of the mandrel 110 for cleaning or replacement. Similar constructed and provided posts 144 and 145 are provided for mounting the opposing sleeve member 121 as is also seen in FIGS. 1 and 6. Posts 144 and 145 are provided with a cross brace 147 and are pivoted on an axial 146 journaled by spaced journal box illustrated on the base plates 31 and 32.

When all of the posts 134, 135, 144 and 145 are in vertical position, a relative positions are retained by the holding links 150 and 151 which have suitable apertures at their opposite ends for receiving the retaining pins provided on the upper end of the each of the aforementioned vertical posts, such as the pins 152 and 153 in FIG. 6. The vertical orientation of the posts 144 and 145, when so retained by the links 150 and 151 is assured by the stop post 148 which is mounted by bolts to the bar 35 which is mounted to the machine frame 10. From the foregoing, it can be seen that the individual components of the member shaping means, including the sleeve members 121 and 122 and their forward portions 123 and 124, respectively, are each easily moveable away from the mandrel 110 in order facilitate the removal, replacement and cleaning of the mandrel and surrounding machine components.

As the dough toroids, as seen in FIG. 2, leave the rear end of the articulated belt like toroid forming machine of the preferred exemplary embodiment as thus described, they may be received upon an exit conveyor, indicated generally at 160 for movement to a dough proofing station

ALTERNATIVE EXEMPLARY EMBODIMENT

Figures 11, 12, 13:
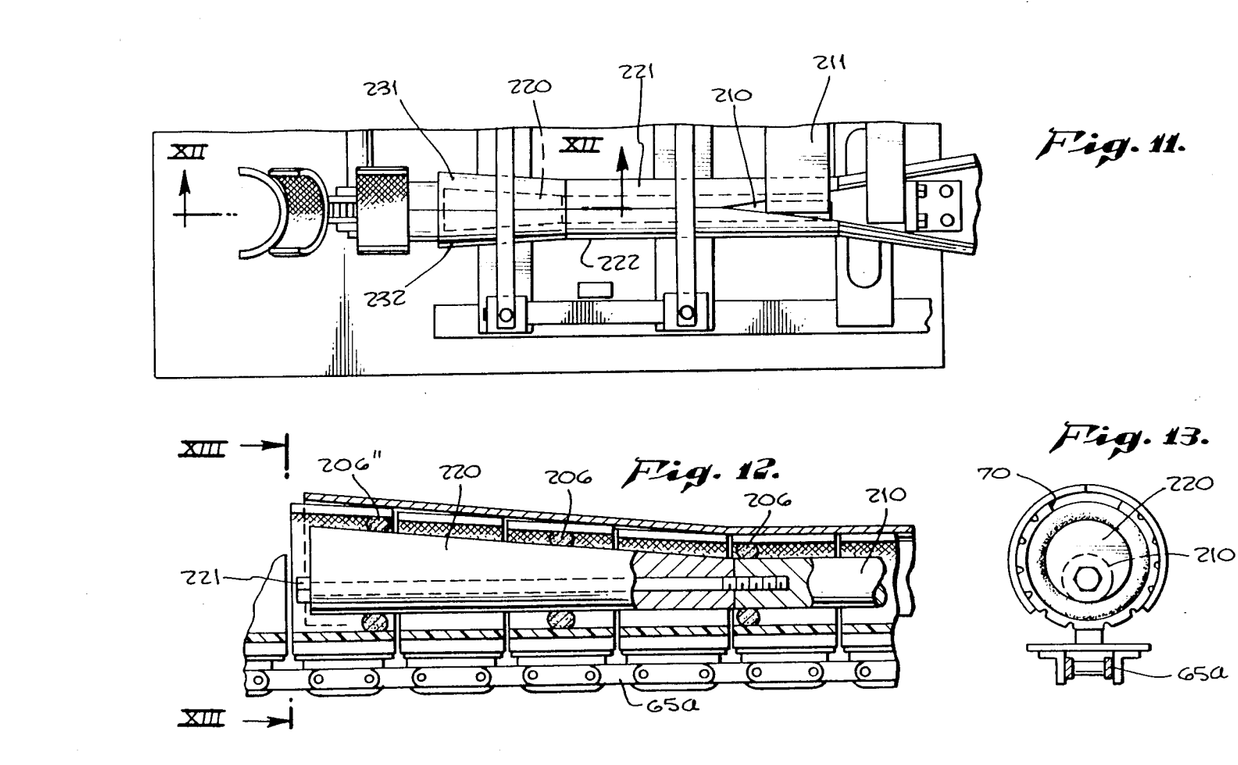
FIG. 11 is a plan view of portions of the machine as in FIG. 1 with an alternative exemplary embodiment of mandrel means about which the dough strip is formed into toroidal configuration and alternative embodiment of dough forming member shaping means, specifically shown as a tube surrounding the mandrel in spaced relation to form the dough toroid there within, the exemplary mandrel and tube end sections having expanding outwardly tapered removable end sections in accordance with an aspect of the present invention.
FIG. 12 is a side view, partially in section, of the embodiments of FIG. 11 taken therein along the plane XII—XII.
FIG. 13 is a vertical end view of the embodiments of FIG. 12 taken therein along the plane XIII—XIII.

Referring now to FIGS. 11, 12 and 13, an alternative exemplary embodiment of mandrel means and member shaping means, in accordance with the present invention, will be described. The mandrel means of this alternative exemplary embodiment includes the provision of a mandrel 210 suspended as before by an appropriate mounting flange 211 on the machine frame, has a separate, removable mandrel end portion 220. As seen in FIG. 12, a mandrel end portion 220 in accordance with the present invention and the present alternative exemplary embodiment thereof, has an upwardly and outwardly tapered configuration eccentric to the access of the cylindrical mandrel 210, as viewed from the end view of FIG. 13, so as to provide an enlarged internal diameter for the toroid being formed. As seen in FIG. 12, the exemplary toroid 206 is expanded to a larger configuration, while remaining of the same weight, as it moves along to the positions represented by the toroids 206' and 206". The removable mandrel end 220 is mounted by bolt 221 to a threaded end of mandrel 210 in such a manner that it can be easily removed for replacement or cleaning.

In this exemplary embodiment, the member shaping means, including the sleeve members 221 and 222 are provided with outwardly tapered dough exit ends 231 and 232, respectively as seen in FIGS. 11 and 12. As seen in FIG. 12, the lower inner ends of the sleeve members 221 and 222 remain constant relative the upper chain lay 65a through the outer rear end thereof, while the upper portions which have formed a substantially cylindrical configuration in the general area of toroid 206 have an expanding cylindrical configuration with the access moving vertically, or eccentrically of the mandrel access toward the exit end where its configuration is shown in FIG. 13. It is contemplated within the present invention that a plurality of mandrel ends 220 of different lengths and/or sizes can be provided so as to give the machine user the option of forming a variety of different size toroids, of any given weight, with the same basic machine through the simple assembly of the alternative mandrel members as thus described.

SECOND ALTERNATIVE EXEMPLARY EMBODIMENT

Referring now to FIGS. 14, 15 and 16 an alternative exemplary embodiment of toroid forming member, in accordance with the present invention is illustrated.

The exemplary member 270 is preferably provided in the same manner as member 70 of the first exemplary embodiment, but with the provision of overlapping end portions. As seen in FIG. 14, the lateral ends of member 270 are provided with a plurality of spaced projections of finger like configuration whereby the plurality of projections or fingers 271 on end 272 are adapted to fit within a mating plurality of spaces 273 in end 274. The plurality of projections or fingers 275 on member body end 274 are configured to fit within the spaces 276 between the fingers or projections 271 on end 272. The member ends 272 and 274 are shown in interlocked relation as seen in FIG. 15 where the fingers 271 and 275 respectively are fully received within the opposing spaces 273 and 276 respectively. As seen in FIG. 16 the ends 272 and 274 can be an interfitting, engaging relation with the fingers of one end only partially received within the spaces of the other end. The toroid forming member 270 of the present embodiment, is particularly suitable for use in association with the expanding mandrel means and expanding member shaping means of the embodiment of FIGS. 11 through 13 in that the toroid being rolled between the mandrel means and toroid forming members continues to have contact with the member ends 272 and 274 as they are spread from one another toward a separated position as seen in FIG. 13 with the prior embodiment.

Having thus described exemplary embodiments of the articulated belt like toroid forming machine, toroid forming members, mandrel means and member shaping means in accordance with the present invention it should now be apparent to those skilled in the art that the aforementioned advantages and objects of the present invention have been attained. It should also be understood that various modifications, variations and adaptations of the toroid forming machine, components and toroid forming methods and mode of operation of the machine of the present invention may be made by others within the scope of the present invention which is defined by the following claims.

I claim:

1. An articulated, belt like toroid forming machine comprising:
    a plurality of individual dough forming members;
    conveyor means for mounting said members in a substantially continuous, belt like, array in a closed revolving loop with said members facing outwardly of said loop;
    each of said members being uniformly flexible laterally across the width thereof in a direction which is generally perpendicular to the direction of revolution of the members on said conveyor means;
    mandrel means positioned relative said conveyor means to allow passage of said members along a mandrel portion thereof with a dough strip positioned therebetween;
    member shaping means positioned relative said mandrel portion and conveyor means for flexing said members into generally cylindrical configuration about said mandrel portion when conveyed thereby by said conveyor means whereby dough strips positioned therebetween are rollable into toroid form, and wherein:
    each of said dough forming members comprises a body having outer ends which come into juxtaposition when said members are in said cylindrical configuration.
2. The toroid forming machine of claim 1 wherein:
    each of said dough forming members comprises a single sheet of plastic material having a plurality of non-flexible sections connected by integrally formed hinge like webs.
3. The toroid forming machine of claim 1 wherein:
    said conveyor means comprises a chain mounted on a pair of spaced motor driven sprockets;
    member mounting means are provided for mounting each of said members by a midportion thereof to said chain; and
    moveable sprocket mounting means are provided wherein at least one of said sprockets is moveably mounted for selective release of the chain and forming members from said machine for ease of replacement thereof.
4. The toroid forming machine of claim 1 wherein:
    said outer ends each being formed with finger like projections separated by finger configured spaces whereby said ends interfit into each other, projections on each one of said ends slip-fitting into spaces on the other of said ends in progressively interlocking relation as said ends come together.
5. The toroid forming machine of claim 1 wherein:
    said mandrel means includes an outwardly expanding tapered dough exit end; and,
    said mandrel portion of said member shaping means has an outwardly expanding tapered dough exit shaping end, whereby dough toroids being formed between said mandrel and shaping means are expanded in size at the exit end of said mandrel means and shaping means relative an initial toroid size formed therebetween.
6. The toroid forming machine of claim 5 wherein:
    mounting means are provided for removeably mounting said mandrel end and said shaping end whereby said ends are removeable for cleaning and replacement thereof.
7. The toroid forming machine of claim 1 wherein:
    said member shaping means comprises a sleeve made up of opposing sleeve half members, each member having a substantially flat entrance end portion and a substantially semi-cylindrical exit end portion; and
    means for mounting said sleeve half members in opposing relation over said conveyor means with said forming members passing therethrough.
8. The toroid forming machine of claim 7 wherein:
    said means for mounting said sleeve half members is provided for mounting said members for selective movement toward and away from said mandrel means for ease of cleaning of said members and mandrel means.
9. The toroid forming machine of claim 1 wherein:
    said conveyor means includes a plurality of semicylindrical cups on a chain mounted about a pair of spaced motor driven sprockets; and
    said dough forming members each comprise a sheet of plastic material of generally rectangular shape having a midportion laminated to an associated one of said cups and opposite ends thereof extending freely outwardly of said one of said cups; and
    said member shaping means has a semi-cylindrical tube half section whereby said sheet of plastic material is formed between said associated one of said cups and the semi-cylindrical tube half section into a cylindrical configuration as it revolves on said conveyor means past said tube half section.

10. A toroid forming machine, having a frame, a revolving conveyor and a motor for driving said conveyor, comprising:
a plurality of individual dough forming members mounted in a continuous array along said conveyor, each of said members being sufficiently flexible laterally so as to be capable of assuming various configurations of their lateral extent in the range of substantially flat to substantially cylindrical;
a guide means engageable by said dough forming members as they revolve on said conveyor for flexing said members individually between a substantially flat configuration and a substantially cylindrical configuration;
a mandrel means supported on said frame and positioned relative said conveyor and conveyor mounted dough forming members to be centrally located relative said members when they are of substantially cylindrical configuration; and
dough molding means mounted relative said mandrel, conveyor and dough forming members for receiving and molding dough into a substantially laterally straight dough strip over of said dough forming members when in said substantially flat configuration whereby said dough strips are rolled initially, between said members and molding means are rolled thereafter between said members and mandrel to form said dough strips into dough toroids.

11. The toroid forming machine of claim 10 wherein:
said dough forming members each comprise a generally rectangular piece of polypropylene material provided as a plurality of non-flexible sections integrally formed with each other by hinge forming webs between said sections, said webs providing lateral flexibility to the joined individually non-flexible sections.

12. The toroid forming machine of claim 10 wherein said guide means comprises a cylindrical split tube having two tube half members, each having a flattened quarter cylinder entrance portion whereby said forming members are received in said tube entrance portion in substantially flat configuration and are subsequently uniformly flexed across their width into said substantially cylindrical configuration.

13. The toroid forming machine of claim 12 wherein:
said cylindrical split tube has an outwardly tapered exit portion; and
said mandrel means has an expanding diameter dough exiting end portion whereby said dough toroids are expanded beyond an initial toroid shape by the action of said of said mandrel end portion and the adjacent dough forming members being guided by the tapered exit portion of said tube.

14. The toroid forming machine of claim 10, wherein said dough forming member each comprise:
a substantially rectangular body mounted at a midportion to said conveyor with laterally spaced free ends being substantially oppositely facing when said member is in said substantially flat configuration and substantially opposing each other when said member is in said cylindrical configuration, said free ends being each provided with finger like projections separated by finger receiving spaces whereby said ends overlap each other in a finger into finger space interlocking relationship when said member is in said cylindrical configuration.

15. The toroid forming machine of claim 10 wherein:
said conveyor means includes a forming member mounting chain and
conveyor chain mounting means are provided for removably mounting said continuous array of dough forming members and said chain for replacement by an alternate array of forming members on an alternate chain.

16. The toroid forming machine of claim 10 wherein said guide means comprises a split sleeve with mounting means for removable mounting said sleeve to said machine frame about said mandrel means, said split sleeve comprising two halves removably mounted relative one another.

17. In an articulated, belt like toroid forming machine having a plurality of individual forming members, conveyor means for mounting said members in a substantially continuous, belt like, array in a closed revolving loop, mandrel means positioned relative said conveyor means to allow passage of said members along a mandrel portion thereof with a dough strip positioned therebetween and member shaping means positioned relative said mandrel portion and conveyor means for flexing said members into generally cylindrical configuration about said mandrel portion when conveyed thereby by said conveyor means whereby dough strips positioned therebetween are rollable into toroid form, the improvement comprising the provision of:
each of said dough forming members comprising a single sheet of plastic material having a plurality of non-flexible sections connected by integrally formed hinge like webs; whereby each of said members is uniformly flexible laterally across the width thereof in a direction which is generally perpendicular to the direction of revolution of the members on said conveyor means.

18. In a toroid forming machine, having a frame, a revolving conveyor and a motor for driving said conveyor, a plurality of individual dough forming members mounted in a continuous array along said conveyor, a guide means engageable by said dough forming members as they revolve on said conveyor for guiding said members individually between a substantially flat configuration and a substantially cylindrical configuration, a mandrel means supported on said frame and positioned relative said conveyor and conveyor mounted dough forming members to be centrally located relative said members when they are of substantially cylindrical configuration, dough molding means mounted relative said mandrel, conveyor and dough forming members for receiving and molding dough into a substantially laterally straight dough strip over of said dough forming members when in said substantially flat configuration whereby said dough strips are rolled initially between said members and molding means and are rolled thereafter between said members and mandrel to form said dough strips into dough toroids, the improvement comprising the provision of:
said dough forming members each comprising a generally rectangular piece of polypropylene material provided as a plurality of non-flexible sections integrally formed with each other by hinge forming webs between said sections, said webs providing lateral flexibility to the joined individually non-flexible sections whereby each of said members is sufficiently flexible laterally so as to be capable of assuming various configurations of their lateral extent in the range of substantially flat to substantially cylindrical.

19. In a toroid forming machine having a plurality of individual forming members, conveyor means for mounting said members in a substantially continuous, belt like, array in a closed revolving loop, mandrel means positioned relative said conveyor means to allow passage of said members along a mandrel portion thereof with a dough strip positioned therebetween and member shaping means for flexing said members about said mandrel portion when conveyed thereby, the improvement comprising the provision of:

each of said members being sufficiently flexible laterally so as to be capable of assuming various configurations of their lateral extent in the range of substantially flat to substantially cylindrical;

an outwardly expanding tapered dough exit end on said mandrel portion; and an outwardly expanding tapered dough exit shaping end on said member shaping means whereby dough toroids being formed between said mandrel and shaping means are expanded in size at the exit end of said mandrel means and shaping means relative an initial toroid size formed therebetween.

* * * * *